US000001335H

United States Statutory Invention Registration [19]

[11] Reg. Number: H1335

[43] Published: Jul. 5, 1994

Plichta et al.

[54] HIGH TEMPERATURE MOLTEN SALT THERMAL CELL

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 14,606

[22] Filed: Feb. 8, 1993

[51] Int. Cl.[5] ..... H01M 6/34

[52] U.S. Cl. ..... 429/199; 429/218

[58] Field of Search ..... 429/112, 172, 122, 199, 429/218; 204/291, 243 R

[56] References Cited

U.S. PATENT DOCUMENTS 3,898,096 8/1975 Herédy et al. ..... 429/103

*Primary Examiner*—Robert L. Stoll
*Assistant Examiner*—Joseph D. Anthony
*Attorney, Agent, or Firm*—Michael Zelenka; Roy E. Gordon

[57] ABSTRACT

A high temperature molten salt thermal cell is provided including an alkali metal containing anode, a molten lithium halide electrolyte and at least one binary sulfide of chromium as the cathode.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH TEMPERATURE MOLTEN SALT THERMAL CELL

GOVERNMENT INTEREST

The invention described herein may be manufactured, used, and licensed by or for the Government for governmental purposes without the payment to us of any royalties thereon.

FIELD OF INVENTION

The invention relates in general to high temperature molten salt thermal cells and in particular to such cells where the active cathode material is thermally stable at high temperatures an also provides high specific energy densities and specific power densities.

BACKGROUND OF THE INVENTION

High temperature molten salt thermal cells have been required for applications in fuses, projectile rockets, bombs, missiles, decoys, jammers, and torpedos. Amongst the many molten salt thermal cell systems that have been studied over the past many years, the lithium alloy/metal sulfide cells have shown considerable promise for these applications. In the past, these cells have used a lithium alloy (Li-A1) as the anode, an electrolyte including a lithium halide-alkali halide mixture (LiCl-KCl) eutectic and a cathode having as the cathode active material a binary metal sulfide of the general formula YS or $YS_2$ where Y=Fe, Co or Ni. Though the use of these cathode materials has been generally satisfactory, it would be desirable to obtain cathode material that can deliver even higher energy densities at high temperatures.

SUMMARY OF THE INVENTION

The general object of this invention is to provide a high temperature molten salt thermal cell where the active cathode material is thermally stable at high temperatures and also provides high specific energy densities and specific power densities.

It has now been found that the aforementioned objective can be attained by providing a molten salt electrochemical thermal cell where the active cathodic materials include at least one of the binary sulfides of chromium metal such as CrS, $Cr_3S_4$, or $Cr_2S_3$. Use of these cathodic materials in an electrochemical cell including a Li-A1 alloy anode and a molten LiCl-LiF-LiBr electrolyte has been demonstrated to deliver specific energy densities of about 219 Wh/kg at a current density of 100 mA/cm$^2$ at an operating temperature of 490° C.

DESCRIPTION OF THE PREFERRED EMBODIMENT

The electrochemical cell described herein includes a lithium-aluminum alloy of 48 atomic percent lithium as the anode, an all lithium halide mixture of 47 mole percent lithium fluoride, 31 mole percent lithium chloride and 22 mole percent lithium bromide with a melting point of 445° C. as the electrolyte, and chromium sesquisulfide ($Cr_2S_3$)as the cathode active material. The discharge reactions of the cell may be represented by the following reactions:

$$3Cr_2S_3+2LiA1\rightarrow 2Cr_3S_4+Li_2S+2A1$$

$$2Cr_3S_4+4LiA1\rightarrow 6CrS+2Li_2S+4A1$$

$$6CrS+12LiA1\rightarrow 6Li_2S+12A1+6Cr$$

The electrochemical cell includes a three pellet stack of anode, electrolyte and cathode held together by a spring loaded cell design.

DESCRIPTION OF THE DRAWING

Figure 1:
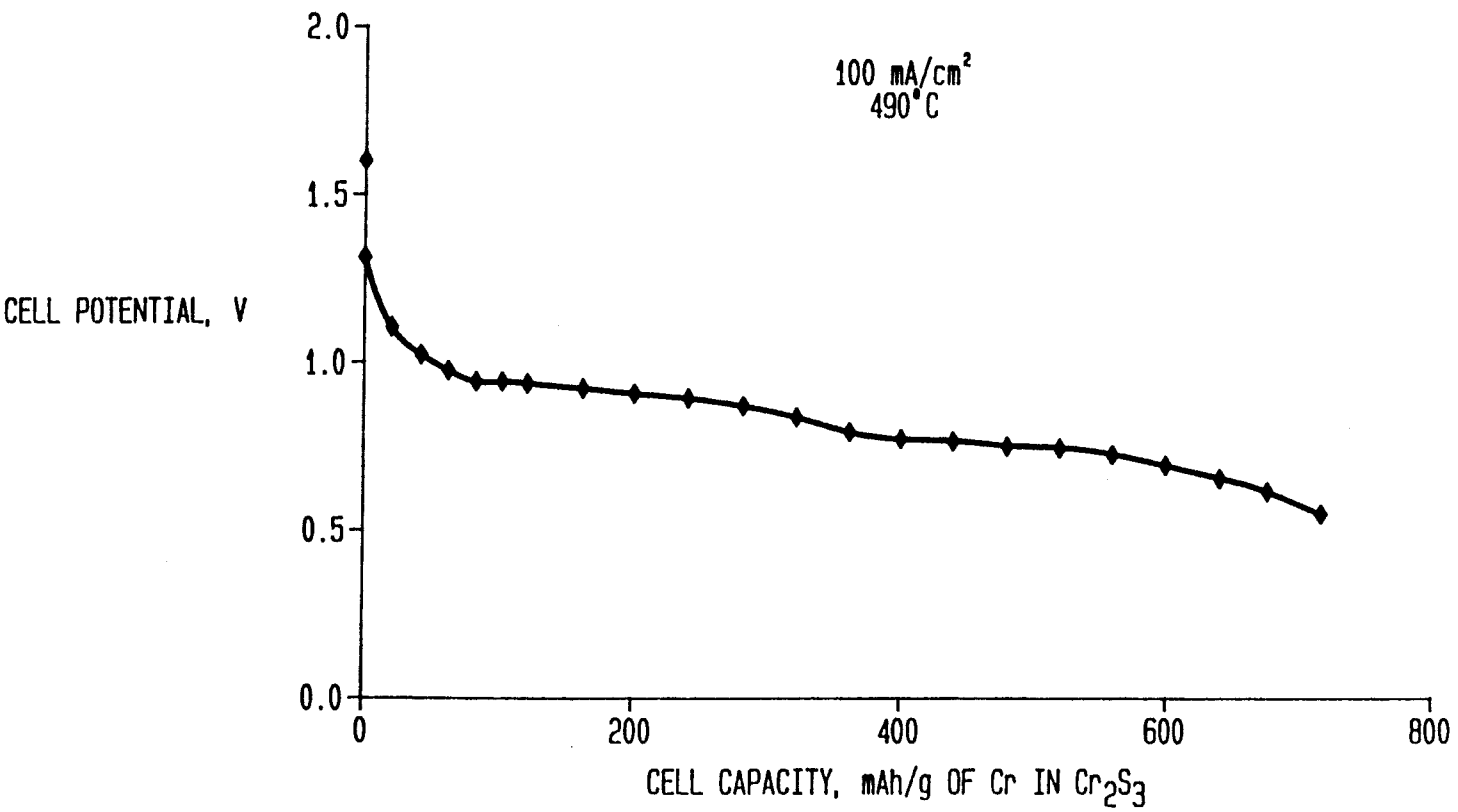
FIG. 1 shows a typical discharge curve of the cell at a current density of 100mA/cm$^2$ at an operating temperature of 490° C.

Referring to FIG. 1, the cell delivers an energy density of 219 Wh/kg and a power density of 0.47 kW/kg at a current density of 100 mA/cm$^2$.

In lieu of the all lithium halide electrolyte mixture of lithium fluoride, lithium chloride and lithium bromide, a eutectic mixture of 59 mole percent lithium chloride and 41 mole percent potassium chloride maybe used as the electrolyte. The molten alkali metal halide electrolyte of the high temperature molten salt thermal cell may also be at least one compound of the group $LiAlCl_4$, $NaAlCl_4$, LiCl, LiF, LiBr, NaCl, NaF, NaBr, KCl, KF, and KBr.

As the anode of the high temperature molten salt electrochemical cell, one might use at least one member of the group consisting of Li, LiAl, Na, K, Ca, Mg or any alkali metal or group IIA element, or alloy or composite mixture of at least two members of the group.

The separator material of the high temperature molten salt thermal cell may be electrically insulative such as MgO, $Y_2O_3$, $ZrO_2$ or ionically conductive material such as Beta alumina. The separation between the anode and the cathode may be provided by a 65 weight percent molten salt electrolyte including any alkali or alkaline earth chloride, fluoride or bromide with 35 weight percent of a separator material as referred to previously.

We wish it to be understood that we do not desire to be limited to the exact details of construction shown and described for obvious modifications will occur to a person skilled in the art.

What is claimed is:

1. A high temperature molten salt thermal cell including an alkali metal containing anode, a molten alkali metal halide electrolyte and at least one binary sulfide of chromium as the cathode.

2. A high temperature molten salt thermal cell according to claim 1 wherein the alkali metal containing anode is at least one member of the group consisting of lithium, lithium-aluminum alloys, lithium-silicon alloys, lithium-boron alloys, sodium, sodium-alloys, potassium, calcium, and magnesium.

3. A high temperature molten salt thermal cell according to claim 1, wherein the binary sulfide of chromium is at least one member of the group consisting of $Cr_2S_3$, $Cr_3S_4$ and CrS.

4. A high temperature molten salt thermal cell according to claim 1 wherein the molten alkali halide electrolyte is at least one member of the group consisting of $LiAlCl_4$, $NaAlCl_4$, LiCl, LiF, LiBr, NaCl, NaF, NaBr, KCl, KF, and KBr.

5. A high temperature molten salt thermal cell according to claim 3 wherein the molten alkali metal halide electrolyte is a eutectic mixture of about 47 mole percent lithium bromide, about 31 mole percent lithium chloride, and about 22 mole percent lithium fluoride.

6. A high temperature molten salt thermal cell according to claim 3 wherein the molten alkali metal halide electrolyte is a eutectic mixture of about 59 mole percent lithium chloride and about 41 percent potassium chloride.

7. A high temperature molten salt thermal cell including a lithium aluminum alloy of about 48 atomic percent of lithium as the anode, a lithium halide eutectic mixture of about 31 mole percent lithium chloride, about 47 mole percent lithium bromide, and about 22 mole percent lithium fluoride as the electrolyte, and chromium sesquisulfide as the cathode.

* * * * *